(12) United States Patent
Yamanoi (10) Patent No.: US 6,248,983 B1
(45) Date of Patent: Jun. 19, 2001

(54) HEATER CONTROL APPARATUS WITH VARIABLE INPUT VOLTAGE RECTIFICATION

(75) Inventor: Masaru Yamanoi, Gunma (JP)

(73) Assignee: Japan Servo Co., Ltd., Kiryu (JP)

( * ) Notice: Subject to any disclaimer, the term of this patent is extended or adjusted under 35 U.S.C. 154(b) by 0 days.

(21) Appl. No.: 09/422,522

(22) Filed: Oct. 20, 1999

(30) Foreign Application Priority Data

Oct. 22, 1998 (JP) .................................................. 10-300515
Nov. 13, 1998 (JP) .................................................. 10-323539

(51) Int. Cl.$^7$ ........................................................ H05B 1/02
(52) U.S. Cl. ............................ 219/501; 219/494; 219/497
(58) Field of Search .................................. 219/501, 494, 219/497, 499, 504, 505, 506, 490, 482, 492; 323/241, 237, 300, 319, 320, 324

(56) References Cited

U.S. PATENT DOCUMENTS

| | | | |
|---|---|---|---|
| 3,842,243 | * 10/1974 | Gregory | 219/497 |
| 4,053,733 | * 10/1977 | Murata et al. | 219/494 |
| 4,086,466 | * 4/1978 | Scharlack | 219/494 |
| 4,100,505 | * 7/1978 | Belt et al. | 331/71 |
| 4,546,239 | * 10/1985 | Sugimori | 219/497 |
| 4,604,517 | * 8/1986 | Barry | 219/494 |
| 4,634,843 | * 1/1987 | Payne | 219/486 |
| 4,636,619 | * 1/1987 | Sugimori | 219/497 |
| 4,740,664 | * 4/1988 | Payne et al. | 219/449 |
| 4,788,398 | * 11/1988 | Hornung | 219/483 |
| 5,239,164 | * 8/1993 | Hirota | 219/492 |

* cited by examiner

Primary Examiner—Tu Ba Hoang
(74) Attorney, Agent, or Firm—Nilles & Nilles SC (57) ABSTRACT

A heater control apparatus wherein a voltage level of the power supply is discriminated by an input voltage discrimination circuit, and in case that an input voltage applied by an AC power supply is the lowest level, the heater is excited by a current corresponding to a full-wave of the input voltage. In case that the input voltage applied by an AC power supply is a level other than the lowest level, the heater is excited by a current substantially equal to that in the case of the input voltage of the lowest level. The exciting current control circuit is composed of a bridge diode, a current limiting resistor for limiting a current flow from the AC power supply, a Zener diode for setting an input voltage discrimination standard value for discriminating a level of the input voltage, a photo coupler for generating an input voltage discrimination signal, and an exciting current signal generating circuit for generating an exciting current signal. In case that a voltage of an AC power supply is the lowest level, the heater is excited by a current corresponding to a full-wave of the input voltage, and in case that the input voltage is a high level, the heater is excited by a current corresponding to a ¼ wave of the input voltage. An exciting current control circuit is provided so that an exciting current signal is generated to make the temperature control properties in the both cases are the same with each other.

9 Claims, 13 Drawing Sheets

HEATER CONTROL APPARATUS WITH VARIABLE INPUT VOLTAGE RECTIFICATION

BACKGROUND OF THE INVENTION

1. Technical Field

This invention relates to a heater control apparatus for use in laminaters or the like.

2. Description of the Prior Art

Figure 13:
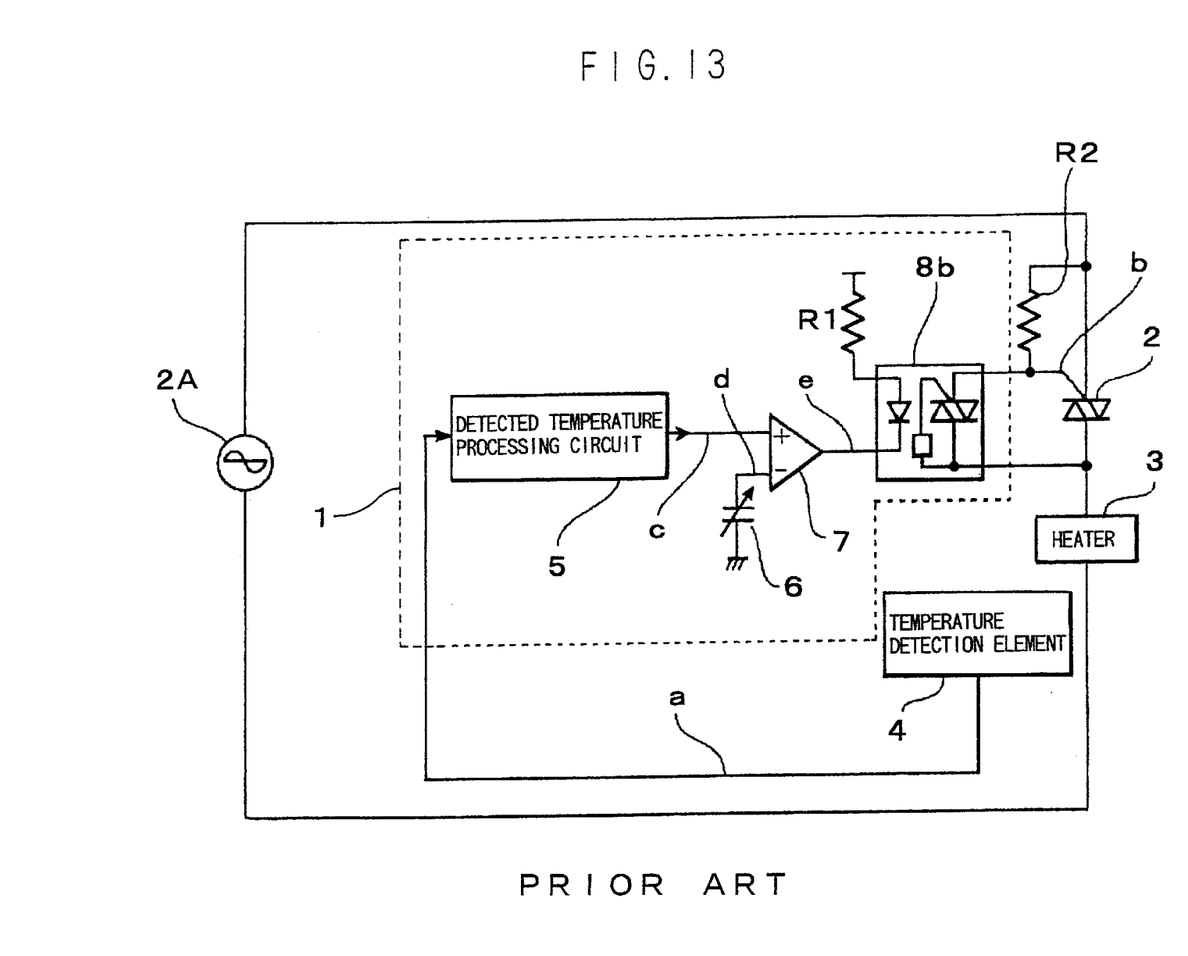
FIG. 13 is a block diagram of a conventional heater control apparatus.

FIG. 13 shows a conventional heater control apparatus, wherein reference numeral 1 denotes a temperature control circuit, 2 denotes a power element consisting of a both-way conducting element, such as a triac, 2A denotes an AC power supply, 3 denotes a heater heated by a current applied from the AC power supply 2A through the power element 2, and 4 denotes a temperature detection element, such as a thermister for detecting the temperature of the heater 3 or an object to be heated by the heater 3.

In such conventional heater control apparatus, the temperature control circuit 1 receives a detected temperature signal a from the temperature detection element 4 and outputs an exciting current control signal b for controlling the power element 2. The power element 2 is controlled by the exciting current control signal b and the heater 3 is heated.

The temperature control circuit 1 comprises a detected temperature processing circuit 5 which receives the detected temperature signal a from the temperature detection element 4 and outputs a detected temperature processing signal c of a predetermined level, a temperature setting device 6 for setting a temperature of the heater 3 or the object heated by the heater 3, a comparator 7 for comparing a temperature setting signal d outputted from the temperature setting device 6 with the detected temperature processing signal c outputted from the detected temperature processing circuit 5, and a zero crossing type power element driver 8b for receiving a control signal e from the comparator 7 and generating the exciting current control signal b, wherein the temperature of the heater 3 or the object heated by the heater 3 is maintained at the temperature set by the temperature setting device 6.

The zero crossing type power element driver 8b comprises a photo triac coupler and resistors as shown in FIG. 13, for example.

R1 and R2 shown in FIG. 13 denote resistors.

Figure 14:
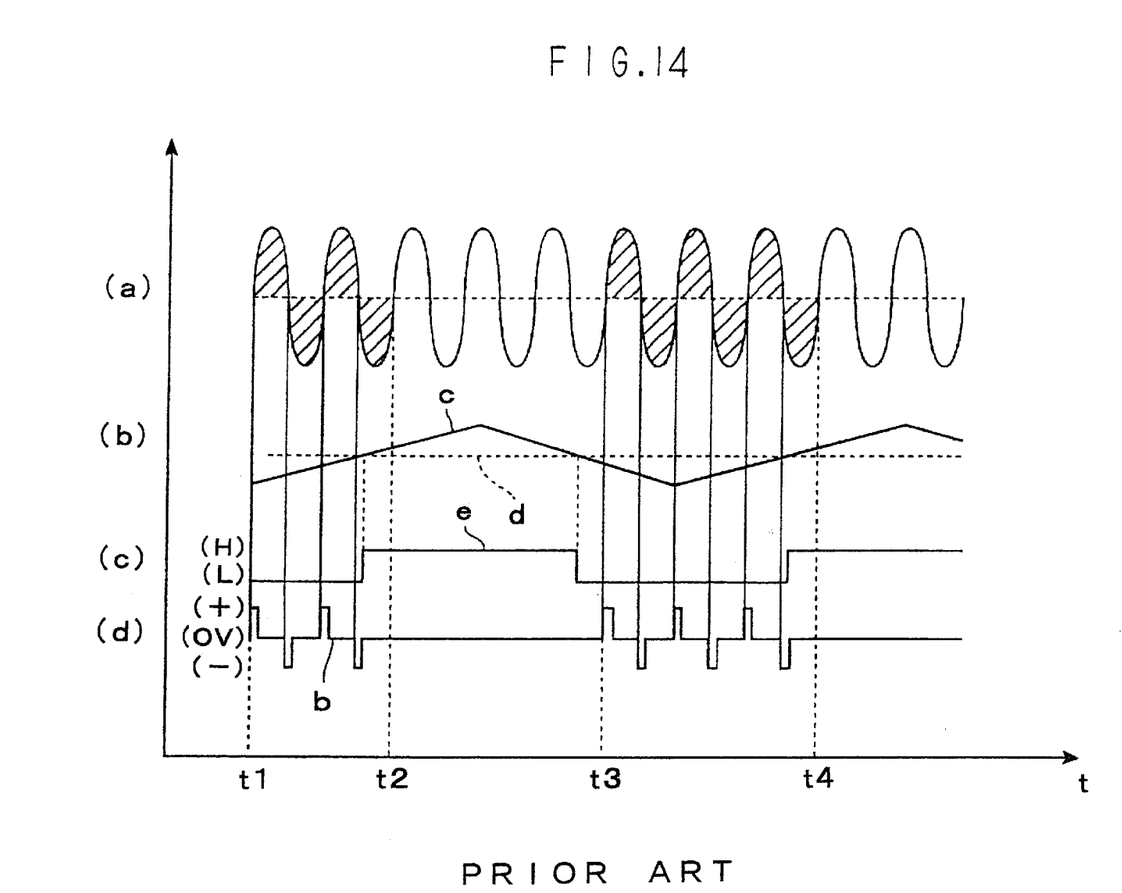
FIG. 14 is a timing chart of an operation of the conventional heater control apparatus shown in FIG. 13.

FIG. 14 shows a timing chart of an operation of the conventional heater control apparatus, wherein hatched wave form portions in FIG. 14(a) show a heater current and solid line portions show an input voltage. In FIG. 14(b), a reference symbol c designates the detected temperature processing signal, and d designates the temperature setting signal. In FIG. 14(c), a reference symbol e designates the control signal. In FIG. 14(d), a reference symbol b designates the exciting current control signal.

The function of the conventional heater control apparatus will now be explained with reference to FIG. 14.

When the detected temperature processing signal c is lower in level than the temperature setting signal d, as shown in FIG. 14(b), the control signal e outputted from the comparator 7 is low level as shown in FIG. 14(c), so that positive pulses and negative pulses of the exciting current control signal b are generated at such a timing that the input voltage (sine wave) applied by the AC power supply 2A becomes zero, as shown in FIG. 14(d).

The power element 2 receives the positive and negative pulses of the exciting current control signal b and supplies the maximum heater current indicated by the hatched portions in FIG. 14(a) to the heater 3 for a period of time from t1 to t2 and a period of time from t3 to t4.

In a period of time from t2 to t3, the detected temperature processing signal c is higher in level than the temperature setting signal d as shown in FIG. 14(b), and the control signal e outputted from the comparator 7 becomes high level (H) as shown in FIG. 14(c), so that the zero crossing type power element driver 8b maintains the exciting current control signal b at zero volt.

The power element 2 receives the exciting current control signal b maintained at zero volt, and stops the current supply to the heater for the period of time from t2 to t3 as shown in FIG. 14(d).

By repeating the above operations, the temperature of the heater 3 or the object heated by the heater 3 can be controlled to a temperature corresponding to the temperature setting signal d set by the temperature setting device 6.

However, the detected temperature signal a detected by the temperature detection element 4 fluctuates in a range due to the time lag of the thermal transmission between the heating portion of the heater 3 and the temperature detection element 4.

The range of fluctuation is varied according to the input voltage and becomes wide when the input voltage becomes high, so that the average temperature becomes high.

Accordingly, it is necessary to adjust the temperature setting signal d set by the temperature setting device 6 so that the mean value of the detected temperature signal a in case that an input voltage of the lowest level is applied is equal to the mean value of the detected temperature signal a in case that an input voltage of a level other than the lowest level is applied, in the conventional heater control apparatus to which at least two levels of input voltage can be applied.

Further, in the prior art, the range of the fluctuation of the detected temperature signal a cannot be adjusted.

SUMMARY OF THE INVENTION

An object of the present invention is to provide a heater control apparatus which solves the above tasks and problems.

Another object of the present invention is to provide a heater control apparatus to which at least two levels of input voltage such as AC 100V and AC 200V are applied selectively, wherein the temperature control properties thereof in case that one level of input voltage is applied thereto is equal to that in case that the other level of input voltage is applied, and wherein no adjustment of the temperature control properties thereof is required.

A further object of the present invention is to provide a heater control apparatus comprising a power element for exciting a heater, a temperature detection element for detecting a temperature of the heater or an object heated by the heater, and a temperature control circuit for generating an exciting current control signal for the power element, wherein in case that an input voltage applied by an AC power supply is the lowest level, the heater is excited by a current corresponding to a full-wave of the input voltage, and in case that the input voltage applied by an AC power supply is a level other than the lowest level, the heater is excited by a current substantially equal to that in the case of the input voltage of the lowest level, the current in case of the level other than the lowest level being obtained by setting a range of an applying time of the input voltage to the heater from a zero crossing point of the input voltage_ according to the level of the AC power source and the frequency thereof.

The heater control apparatus further comprises an exciting current control circuit having a zero crossing detecting circuit for detecting the zero crossing point of the input voltage, an input voltage discrimination circuit for discriminating levels of the input voltage, a frequency setting switch which is set according to a zero crossing detecting signal, an input voltage discrimination signal and the frequency of the AC power supply, an exciting current signal generating circuit for detecting the state of the frequency setting switch and generating a first exciting current signal, and a transistor for receiving the first exciting current signal and generating a second exciting current signal.

Yet further object of the present invention is to provide a heater control apparatus comprising a power element for exciting a heater, a temperature detection element for detecting a temperature of the heater or an object heated by the heater, and a temperature control circuit for generating an exciting current control signal for the power element, wherein in case that a voltage of an AC power supply is the lowest level, the heater is excited by a current corresponding to a full-wave of the input voltage, and in case that the input voltage is a high level, the heater is excited by a current corresponding to a ¼ wave of the input voltage.

The heater control apparatus further comprises an exciting current control circuit having a full-wave rectifier for rectifying a full-wave of the input voltage, a current limiting resistor for limiting a current flow from the AC power supply, a Zener diode for setting an input voltage discrimination standard value for discriminating a level of the input voltage, a photo coupler for generating an input voltage discrimination signal, an exciting current signal generating circuit for receiving the input voltage discrimination signal and generating a first exciting current signal, and a transistor for receiving the first exciting current signal and generating a second exciting current signal.

The exciting current generating circuit comprises an inverter gate and three D-flip-flops, wherein a control signal is generated for applying a half cycle among the two cycles of the input voltage to the heater and a voltage of ¼ of the full-wave of the input voltage is applied to the heater.

The exciting current signal generating circuit comprises an inverter gate and five D-flip-flops, wherein a control signal is generated for applying one cycle among the four cycles of the input voltage to the heater and a voltage of ¼ of the full-wave of the input voltage is applied to the heater.

DESCRIPTION OF THE PREFERRED EMBODIMENTS

An embodiment of this invention will be explained with reference to FIGS. 1 to FIG. 5.

Figure 1:
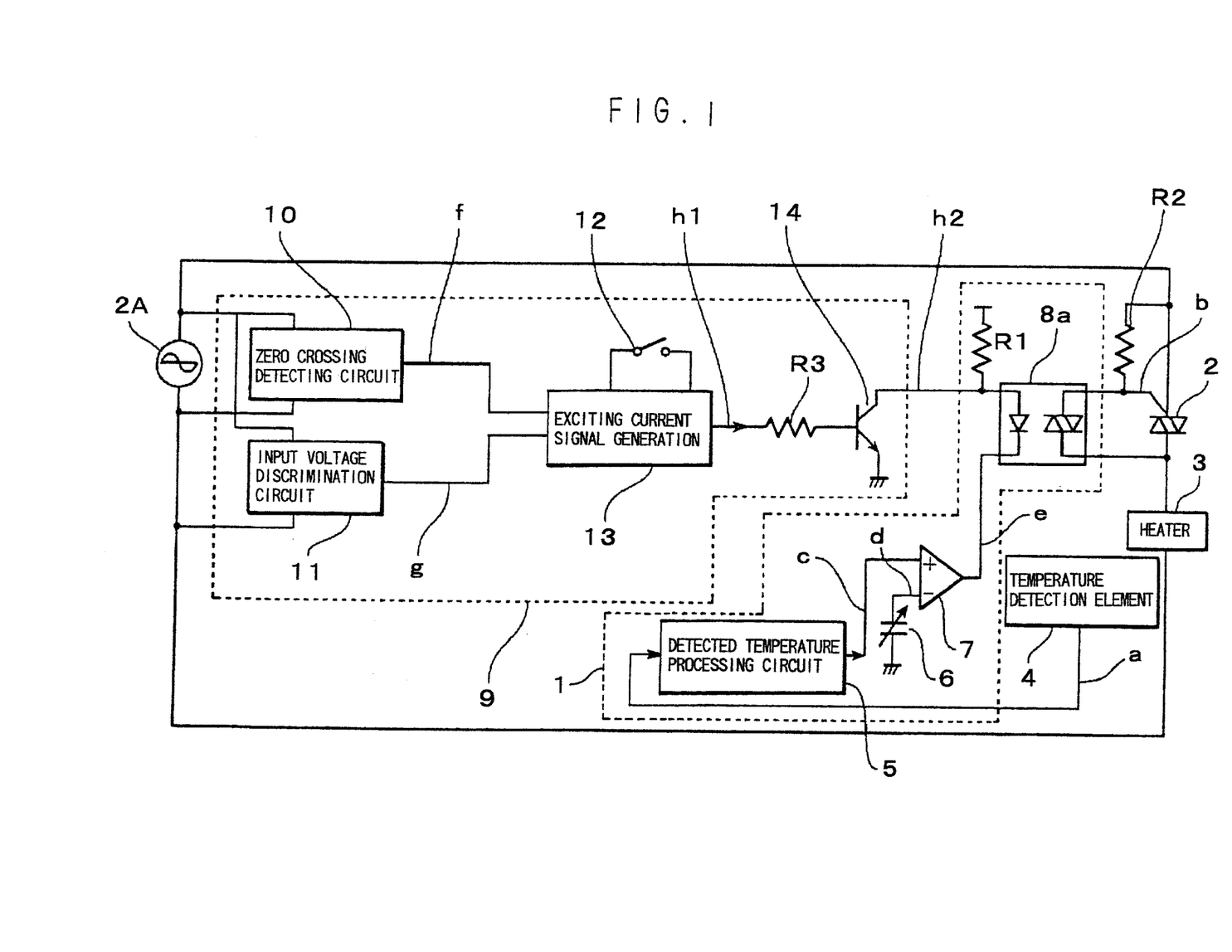
FIG. 1 is a block diagram of a heater control apparatus of an embodiment according to the present invention.

In FIG. 1, parts of the apparatus shown in FIG. 1 which are similar to corresponding parts of the apparatus shown in FIG. 13 have been given corresponding reference numerals and need not be further redescribed.

However, kindly note that the power element driver 8b in the conventional heater control apparatus is of zero crossing type, whereas a power element driver 8a of the present invention is of the non-zero crossing type.

The heater control apparatus of the present invention comprises an exciting current control circuit 9. The exciting current control circuit 9 having, as shown in FIG. 1, a zero crossing detecting circuit 10 which detects a zero crossing point of an input voltage applied by a AC power supply 2A and outputs a zero crossing detection signal f, an input voltage discrimination circuit 11 which discriminates a level of an input voltage applied by the AC power supply 2A and outputs an input voltage discrimination signal g, a frequency setting switch 12 which receives the zero crossing detection signal f and the input voltage discriminating signal g, and sets a frequency corresponding to a frequency of the AC power supply 2A, an exciting current signal generating circuit 13 which detects the setting state of the frequency setting switch 12 and generates an exciting current signal h1, and a transistor 14 as an inversion switching element, which receives the exciting current signal h1 and outputs an exciting current signal h2.

The heater control apparatus of the present invention is characterized in that, the non-zero crossing type power element driver 8a is used instead of the conventional zero crossing type power element drover 8b in order to generates an exciting current control signal b when the non-zero crossing type power element driver 8a receives the exciting current signal h2 outputed from the exciting current control circuit 9 and a control signal e outputted from a comparator 7. In FIG. 1, R3 denotes a resistor.

Figure 2:
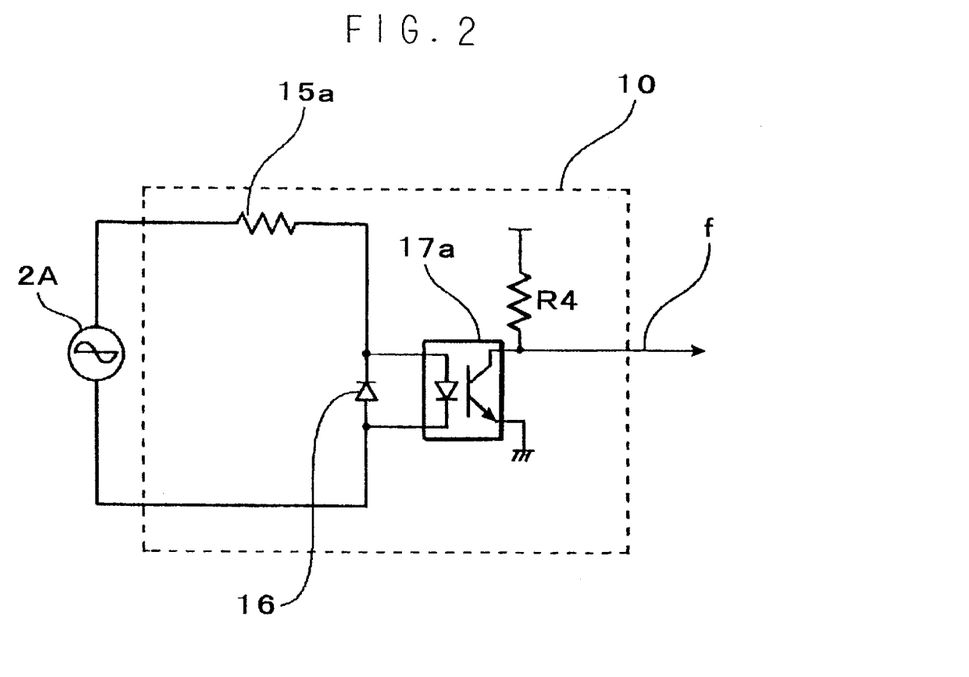
FIG. 2 is a circuit diagram of a zero crossing detecting circuit of the heater control apparatus according to the present invention.

FIG. 2, shows an example of the zero crossing detecting circuit 10 wherein a photo coupler 17a is turned ON when a current is flowed in the (+) direction from the AC power supply 2A to the photo coupler 17a passing through a current limiting resistor 15a, so that the zero crossing detecting signal f becomes low level "L". Further, the photo coupler 17a is turned OFF when a current is flowed in the (−) direction from the AC power supply 2A to the current limiting resistor 15a passing through the photo coupler 17a, so that the zero crossing detecting signal f becomes high level "H". The zero crossing detecting signal f is changed to "L" level from "H" level or to "H" level from "L" level at substantially zero volt of the AC power supply 2A.

In FIG. 2, a diode 16 prevents a large counter voltage from being applied to the input terminal of the photo coupler 17a when the current is flowed in the (−) direction from the AC power supply 2A, and the current limiting resistor 15a limits the current passing through the photo coupler 17a and the diode 16. R4 denotes a resistor.

Figure 3:
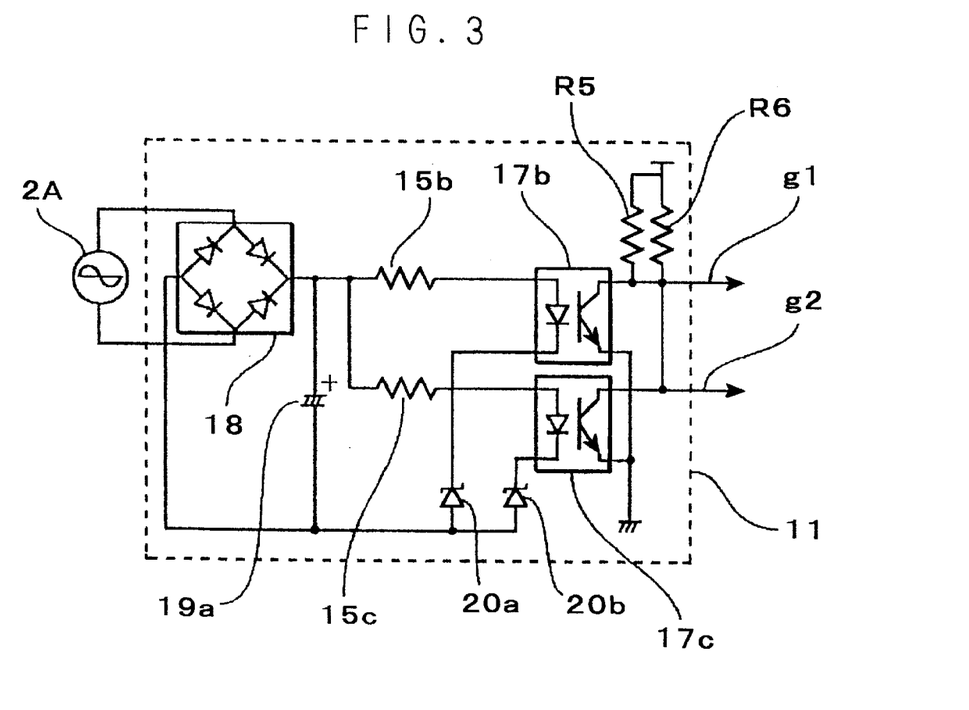
FIG. 3 is a circuit diagram of an input voltage discrimination circuit of the heater control apparatus according to the present invention.

FIG. 3 shows an example of the input voltage discrimination circuit 11 which is applicable to three levels of AC power supply 2A. As shown in FIG. 3, an input voltage applied by the AC power supply is full-wave rectified by a bridge diode 18 and smoothed by a capacitor 19a to obtain a DC voltage. For example, AC 100V is converted into DC 141V, AC 120V is converted into DC 170V or AC 200V is converted into DC 283V. A first DC voltage level at which a photo coupler 17b is turned ON is set by a current limiting resistor 15b and a Zener diode 20a. A second DC voltage level at which a photo coupler 17c is turned ON is set by a current limiting resistor 15c and a Zener diode 20b. For example, if the first DC voltage level is set to DC 170V (AC 120V) and the second DC voltage level is set to DC 283V (AC 200V), input voltage discrimination signals g1 and g2 become "H" when the input voltage is AC 100V, whereas the input voltage discrimination signal g1 becomes "L" and the input voltage discrimination signal g2 becomes "H" when the input voltage is AC 120V. The input voltage discrimination signals g1 and g2 become "L" when the input voltage is AC 200V.

In FIG. 3, R5 and R6 denote resistors.

Figure 4:
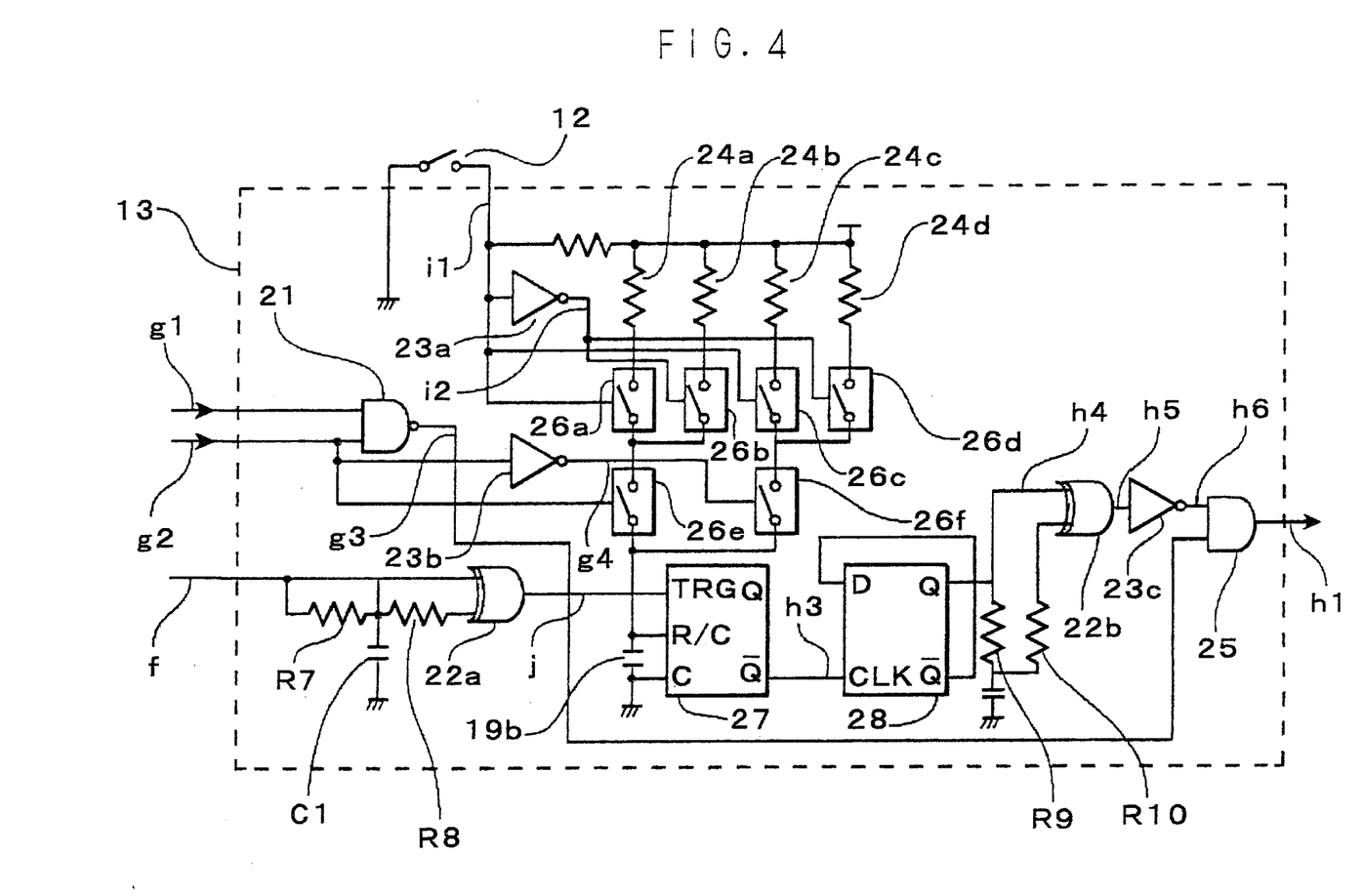
FIG. 4 is a circuit diagram of an exciting current signal generating circuit of the heater control apparatus according to the present invention.

FIG. 4 shows an example of the exciting current signal generating circuit 13, wherein an exclusive OR gate 22a generates a trigger pulse signal j when the zero crossing detecting signal f is changed to "H" from "L" and to "L" from "H".

A monostable multivibrator 27 generates an exciting current signal h3 determined by a combination of one of current exciting time setting resistors 24a to 24d and a capacitor 19b when the trigger signal j is generated.

Analog switches 26a to 26f are turned ON when frequency setting signals i1 and i2, and input voltage discrimination signals g2 and g4 are "H", and turned OFF when the frequency setting signals i1 and i2 and the input voltage discrimination signals g2 and g4 are "L".

The analog switches 26a and 26c are turned ON when the frequency setting switch 12 is turned OFF and an input voltage of 50 Hz is applied.

The analog switches 26b and 26d are turned ON when the frequency setting switch 12 is turned ON and an input voltage of 60 Hz is applied.

Further, the input voltage discrimination signal g2 becomes "H" when the input voltage is AC 120V, and becomes "L" when the input voltage is AC 200V. The analog switch 26e is turned ON when the input voltage is AC 120V, and the analog switch 26f is turned ON when the input voltage is AC 200V.

Accordingly, the capacitor 19b is connected to the current exciting time setting resistor 24a when the input voltage is AC 120V/50 Hz, connected to the current exciting time setting resistor 24b when the input voltage is AC 120V/60 Hz, connected to the current exciting time setting resistor 24c when the input voltage is AC 200V/50 Hz, and connected to the current exciting time setting resistor 24d when the input voltage is AC 200V/60 Hz.

Specifically, each of the current exciting time setting resistors 24a to 24d is determined according to the level of the input voltage and the frequency.

A D-flip-flop 28 generates an exciting current signal h4 of which frequency is a half of the exciting current signal h3 at the heater exciting initiation time or when the leading edge of the exciting current signal h3 is generated.

An exclusive OR gate 22b generates an exciting current signal h5 when the exciting current signal h4 is changed to "L" from "H" and to "H" from "L".

An inverter gate 23C generates an exciting current signal h6 which is an inverted signal of the exciting current signal h5.

A NAND gate 21 receives the input voltage discrimination signals g1 and g2 and generates an input voltage discrimination signal g3. The input voltage discrimination signals g1 and g2 are "H" only when the input voltage is AC 100V, so that the input voltage discrimination signal g3 becomes "L".

Further, either one of the input voltage discrimination signals g1 and g2 is "L" when the input voltage is AC 120V or AC 200V, so that the input voltage discrimination signal g3 becomes "H".

An AND gate 25 receives the exciting current signal h6 and the input voltage discrimination signal g3 and generates the exciting current signal h1. The exciting current signal h1 becomes "L" when the input voltage discrimination signal g3 is "L" (input voltage is AC 100V), so that the heater is excited by the full current. When the input voltage discrimination signal g3 is "H" (input voltage is AC 120V or AC 200V), the exciting current signal h6 is equal to the exciting current signal h1.

In FIG. 4, R7 to R10 represent resistors, and C1 represents a capacitor.

Figure 5:
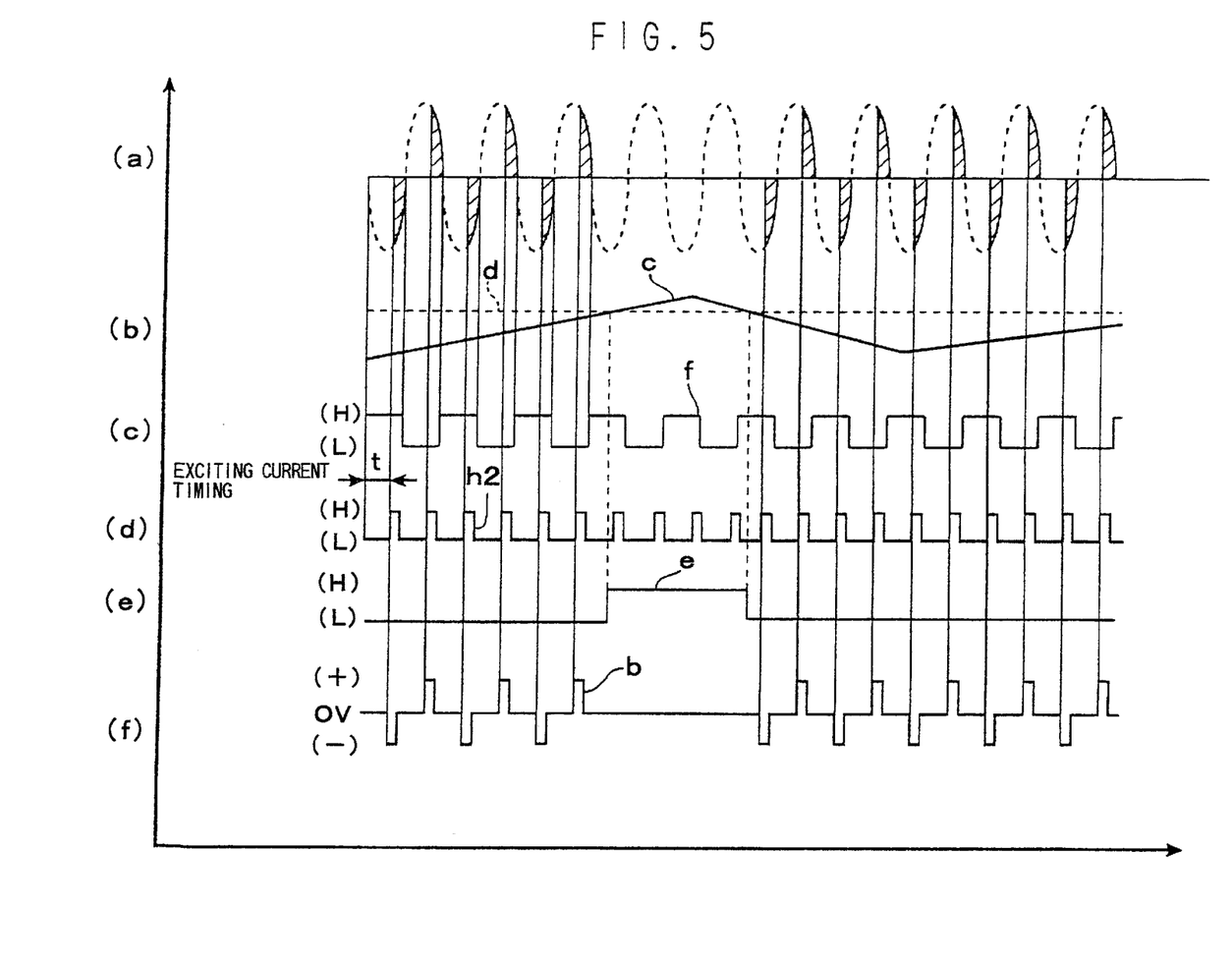
FIG. 5 is a timing chart of an operation of the heater control apparatus according to the present invention.

FIG. 5 shows a timing chart of an operation of the heater control apparatus according to the present invention, wherein hatched wave form portions in FIG. 5(a) show a heater current and solid line portions and dotted line portions show an input voltage. In FIG. 5(b), a reference symbol c designates the detected temperature processing signal, and d designates the temperature setting signal. In FIG. 5(c), a reference symbol f designates the zero crossing detecting signal. In FIG. 5(d), a reference symbol h2 designates the second exciting current signal. The first exciting current signal h1 is an inverted signal of the second exciting current signal h2 and not shown in FIG. 5.

In FIG. 5(e), a reference symbol e designates the control signal.

In FIG. 5(f), a reference symbol b designates the exciting current control signal.

The function of the heater control apparatus according to the present invention will now be explained with reference to FIG. 5.

As shown in FIG. 5, the zero crossing detecting signal f is changed to "H" and "L" alternately at the zero crossing points of the input voltage of the AC power source 2A.

The exciting current signal h2 consists of pulses each generated after a time t from the leading edge and trailing edge of the zero crossing detecting signal f (zero crossing point of the input voltage). The time t is so determined that the value of the exciting current to the heater in case that the input voltage is a level other than the lowest level is substantially equal to that in case that the input voltage is the lowest level with respect to each frequency of the power supply 2A set by the frequency setting switch 12 and the input voltage discrimination signal. The time t is set previously in the exciting current signal generating circuit 13 for each level of the input voltage and the frequency. The non-zero crossing type power element driver 8a receives the exciting current signal h2 and the control signal e and outputs the (+) or (−) pulses of the exciting current control signal b at the leading edge of the exciting current signal h2 when the control signal e is "L", that is, the detected temperature signal c is lower than the temperature setting signal d. The heater current is flowed through the power element 2 until the next zero crossing point of the input voltage by the exciting current control signal b.

In case that the input voltage is the lowest level, the exciting current generating circuit 13 receives the input voltage discrimination signal and generates the exciting current signal h1 of "L". Accordingly, the transistor 14 is turned OFF and the heater is excited by the maximum heater current.

The heater control apparatus of the present invention can be used for at least two levels of the power supply. According to the heater control apparatus of the present invention, the level of the power supply is discriminated, and the heater current is automatically controlled in such a way that if the input voltage is lowest level the heater is excited by the maximum heater current and if the input voltage is a level other than the maximum level the heater current is reduced automatically to a predetermined value so that the heater is heated equally at both levels of the input voltage. Accordingly, it is not necessary to adjust the temperature setting for the different input voltages.

In the embodiment mentioned above, the function of the exciting current generating circuit 13 shown in FIG. 4 may be achieved by any microcomputer.

Figure 6:
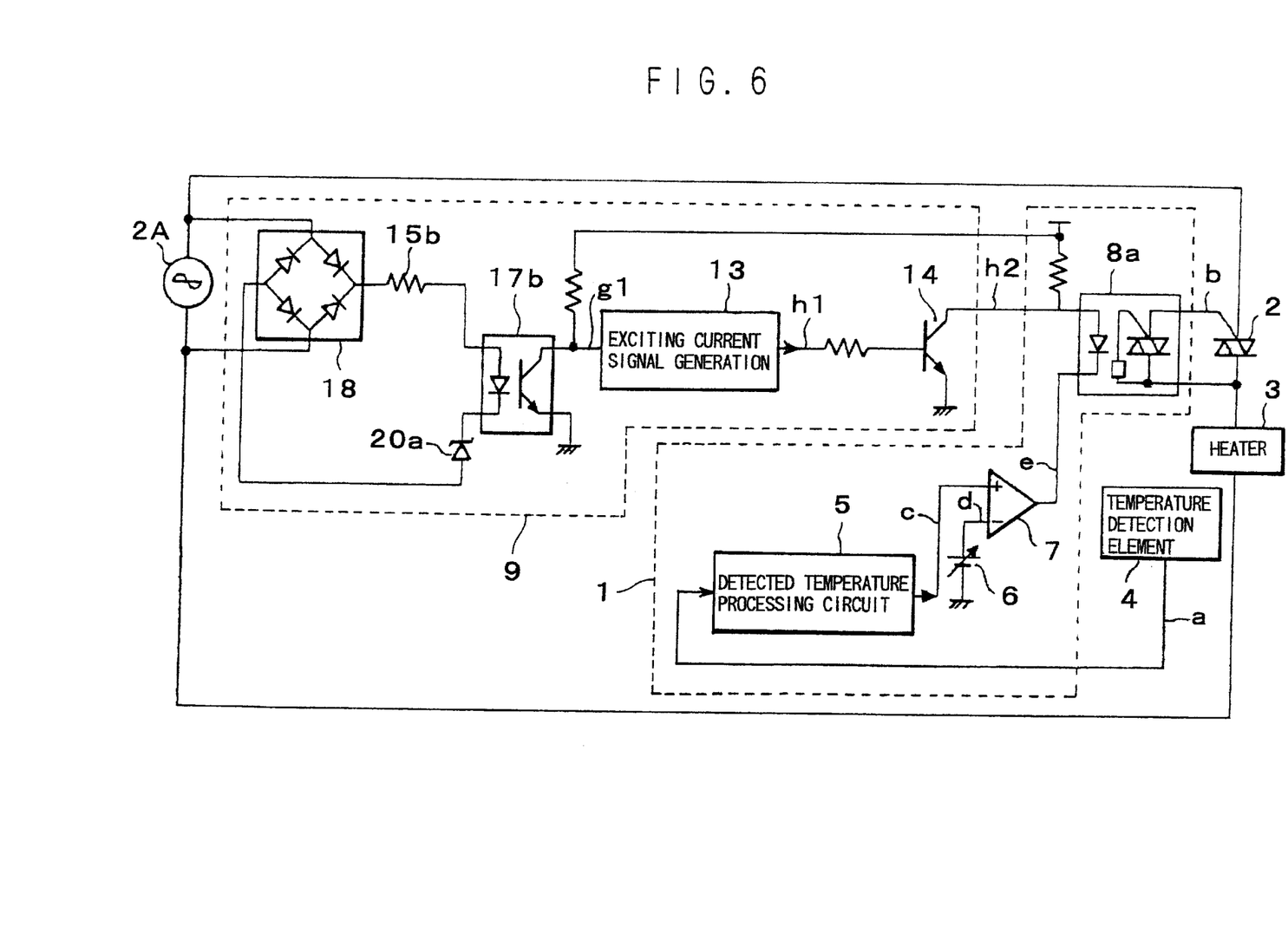
FIG. 6 is a block diagram of a heater control apparatus of the other embodiment according to the present invention.

A further embodiment of this invention will be explained with reference to FIG. 6 and FIG. 7. In FIG. 6, parts of the apparatus shown in FIG. 6 which are similar to corresponding parts of the apparatus shown in FIG. 13 have been given corresponding reference numerals and need not be further redescribed.

The heater control apparatus of the present invention comprises the exciting current control circuit 9 consisting of, as shown in FIG. 6, a bridge diode 18 for full-wave rectifying the input voltage applied by the AC power supply 2A, the current limiting resistor 15b for limiting the heater current from the AC power supply 2A, the Zener diode 20a for setting the input voltage discrimination value for discriminating the input voltage applied by the AC power supply 2A, the photo coupler 17b for generating the input voltage discrimination signal g1, the exciting current signal generating circuit 13 which receives the input voltage discrimination signal g1 and generates the exciting current signal h1, and the transistor 14 as an inversion switching element which receives the exciting current signal h1 and outputs the exciting current signal h2.

The exciting current generating circuit 13 is composed of a logic circuit element which receives the input voltage discrimination signal g1 from the photo coupler 17b and forms the first exciting current signal h1 which is ¼ of the frequency of g1.

Figure 7:
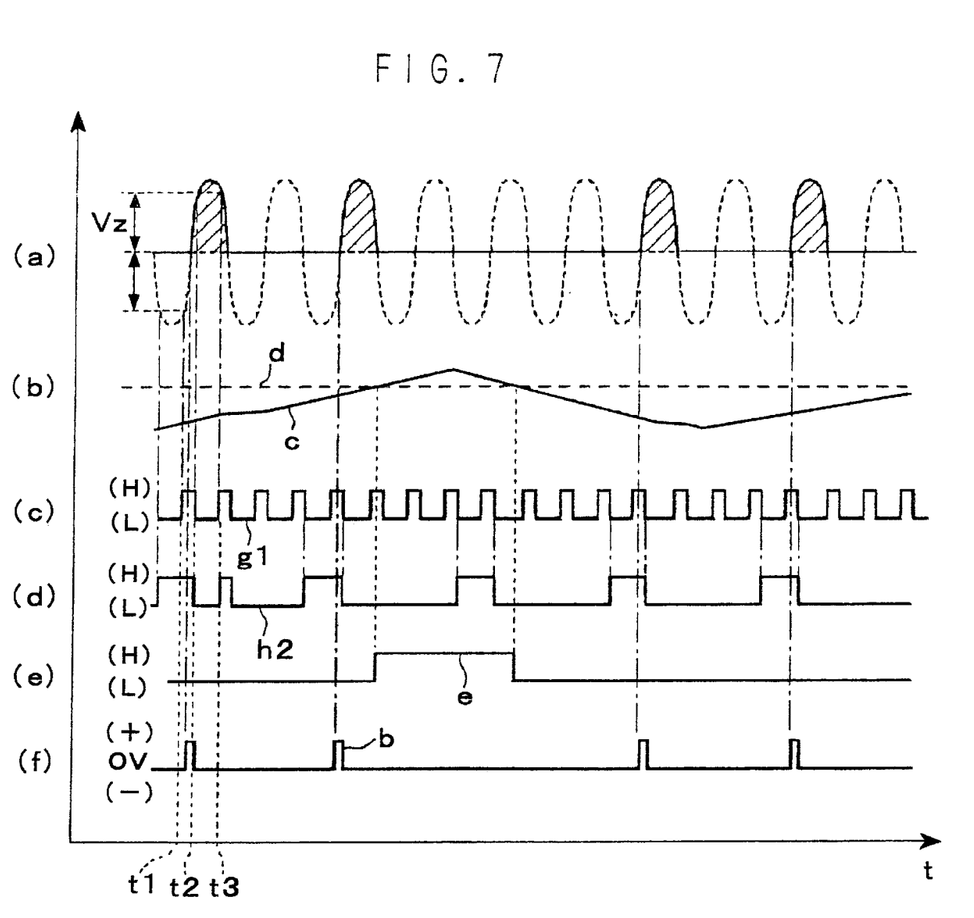
FIG. 7 is a timing chart of an operation of the heater control apparatus shown in FIG. 6.

FIG. 7 shows a timing chart of an operation of the heater control apparatus according to the present invention, wherein hatched wave form portions in FIG. 7(a) show a heater current and solid line portions and dotted line portions show an input voltage. Vz shows a voltage as an input voltage discrimination standard value. In FIG. 7(b), a reference symbol c designates the detected temperature processing signal, and d designates the temperature setting signal. In FIG. 7(c), a reference symbol g1 designates the input voltage discrimination signal.

In FIG. 7(d), a reference symbol h2 designates the second exciting current signal. The first exciting current signal h1 is an inverted signal of the second exciting current signal h2 and not shown in FIG. 7.

In FIG. 7(e), a reference symbol e designates the control signal. In FIG. 7(f), a reference symbol b designates the exciting current control signal.

The function of the heater control apparatus according to the present invention will now be explained with reference to FIG. 7.

As shown in FIG. 7(c), the input voltage discrimination signal g1 becomes the high level "H" if the absolute value of the input voltage applied by the AC power supply through the power element 2 is smaller than the input voltage discrimination standard value set by the Zener diode 20a in the term between t1 to t2, for example, whereas the input voltage discrimination signal g1 becomes the low level "L" as shown in FIG. 7(c) if the absolute value of the input voltage is higher than the input voltage discrimination standard value in the term between t2 to t3, for example.

Accordingly, the input voltage discrimination signal g1 becomes a pulse signal which is changed to "H" and "L" alternately as shown in FIG. 7(c) when the maximum value (absolutely value) of the input voltage is higher than the input voltage discrimination standard value.

The exciting current signal generating circuit 13 receives the input voltage discrimination signal g1 and outputs the exciting current signal h1 which is ¼ of the frequency of g1. The transistor 14 receives the exciting current signal h1 and outputs the exciting current signal h2 as shown in FIG. 7(d).

The power element driver 8a receives the exciting current signal h2 shown in FIG. 7(d) and the control signal e shown in FIG. 7(e) and outputs the (+) or (−) pulses of the exciting current control signal b as shown in FIG. 7(f) at such a timing that the input voltage (sine wave) applied by the AC power supply 2A becomes zero only when the exciting current signal h2 is high level "H" and the control signal e is low level "L". The power element 2 excites the heater 3 according to the exciting current signal b.

Accordingly, in the heater control apparatus of this embodiment, the heater 3 is excited by the heater current of ¼ wave form of the wave form indicated by the solid line shown in FIG. 7(a).

Figure 8:
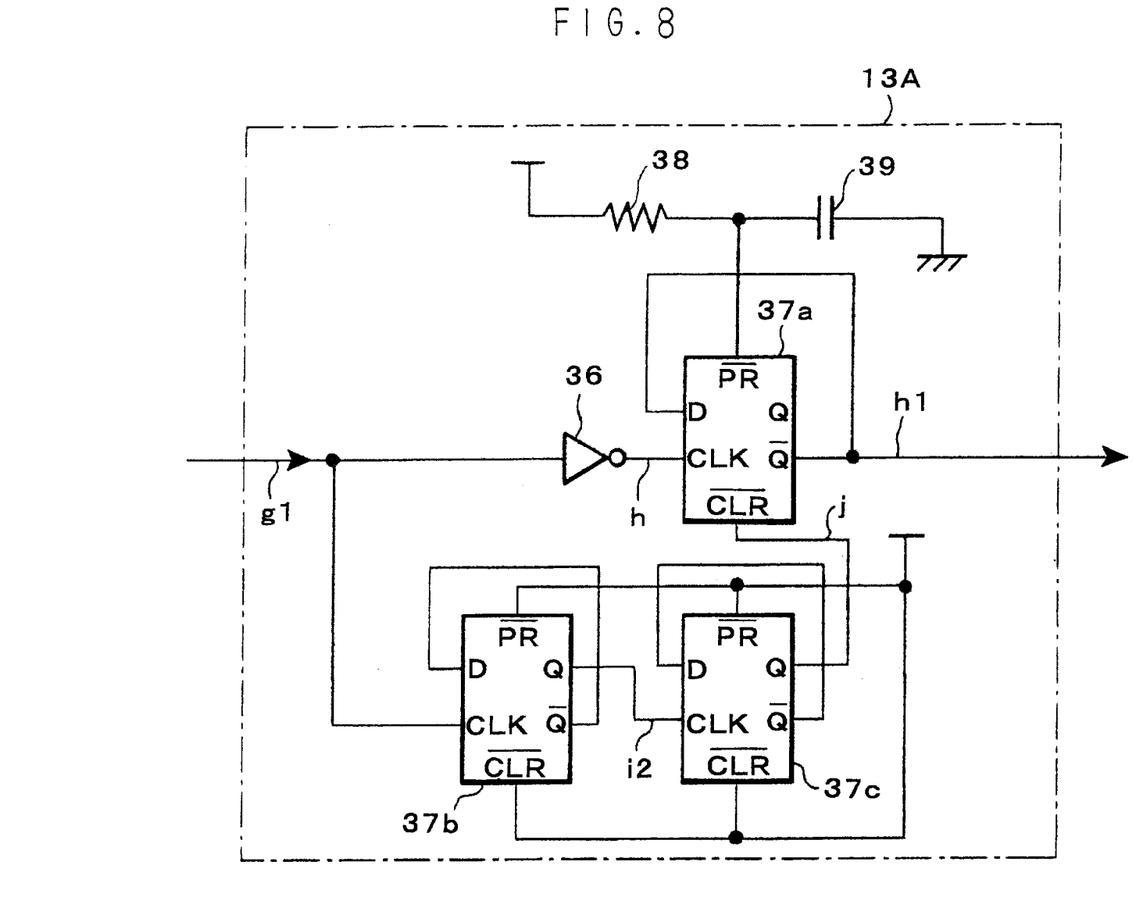
FIG. 8 is a circuit diagram of an embodiment of an exciting current signal generating circuit of the heater control apparatus shown in FIG. 6.

FIG. 8 shows an exciting current generating circuit 13A which is an embodiment of the exciting current signal generating circuit 13 shown in FIG. 6.

As shown in FIG. 8, the exciting current signal generating circuit 13A is composed of an inverter gate 36, three D-flip-flops 37a, 37b, 37c, a resistor 38 and a capacitor 39.

Figure 9:
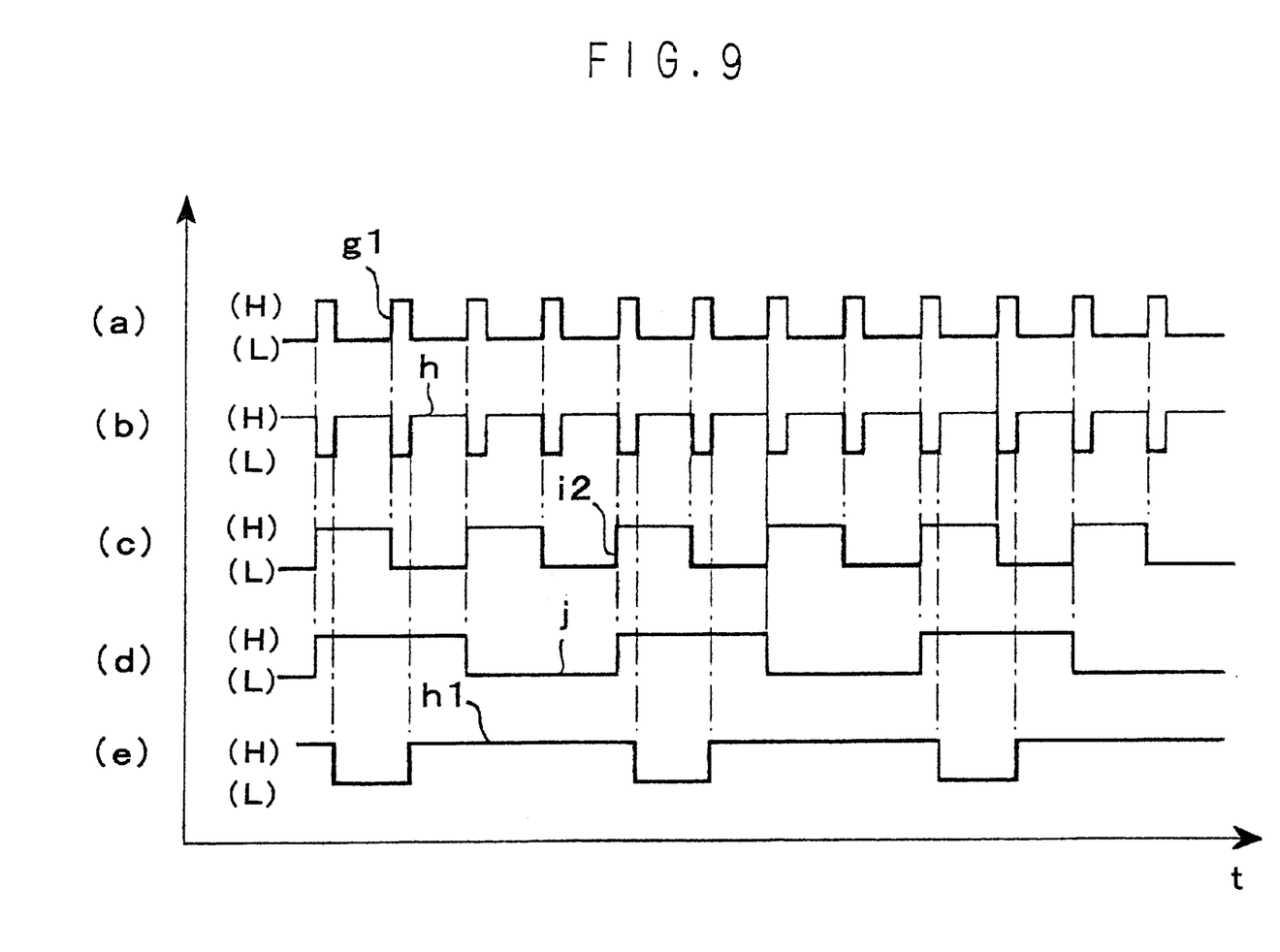
FIG. 9 is a timing chart of an operation of the exciting current signal generating circuit shown in FIG. 8.

The D-flip-flop 37b receives the input voltage discrimination signal g1 from the photo coupler 17b and generates a frequency divided signal i2 which is a signal frequency divided the input voltage discrimination signal g1 by 2 at such a timing that the input voltage discrimination signal g1 is changed to the high level "H" from the low level "L" as shown in FIG. 9(c).

The D-flip-flop 37c receives the frequency divided signal i2 and generates a frequency divided signal j which is a signal frequency divided the input voltage discrimination signal g1 by 4 at such a timing that the input frequency divided signal i2 is changed to the high level "H" from the low level "L" as shown in FIG. 9(d).

The inverter gate 36 receives the input voltage discrimination signal g1 and generates a signal h which is an inverted signal of the input voltage discrimination signal g1, as shown in FIG. 9(b).

The D-flip-flop 37a receives the inverted signal h and the frequence divided signal j and generates an exciting current signal h1 which is a signal frequency divided the inverted signal h by 2 at such a timing that the inverted signal h is changed to the high level "H" from the low level "L" as shown in FIG. 9(e) only when the frequency divided signal j is the high level "H". The exciting current signal h1 becomes a low level "L" every four pulses of the inverted signal h so as to maintain a high level "H" when the frequency divided signal j is the low level "L".

Figure 10:
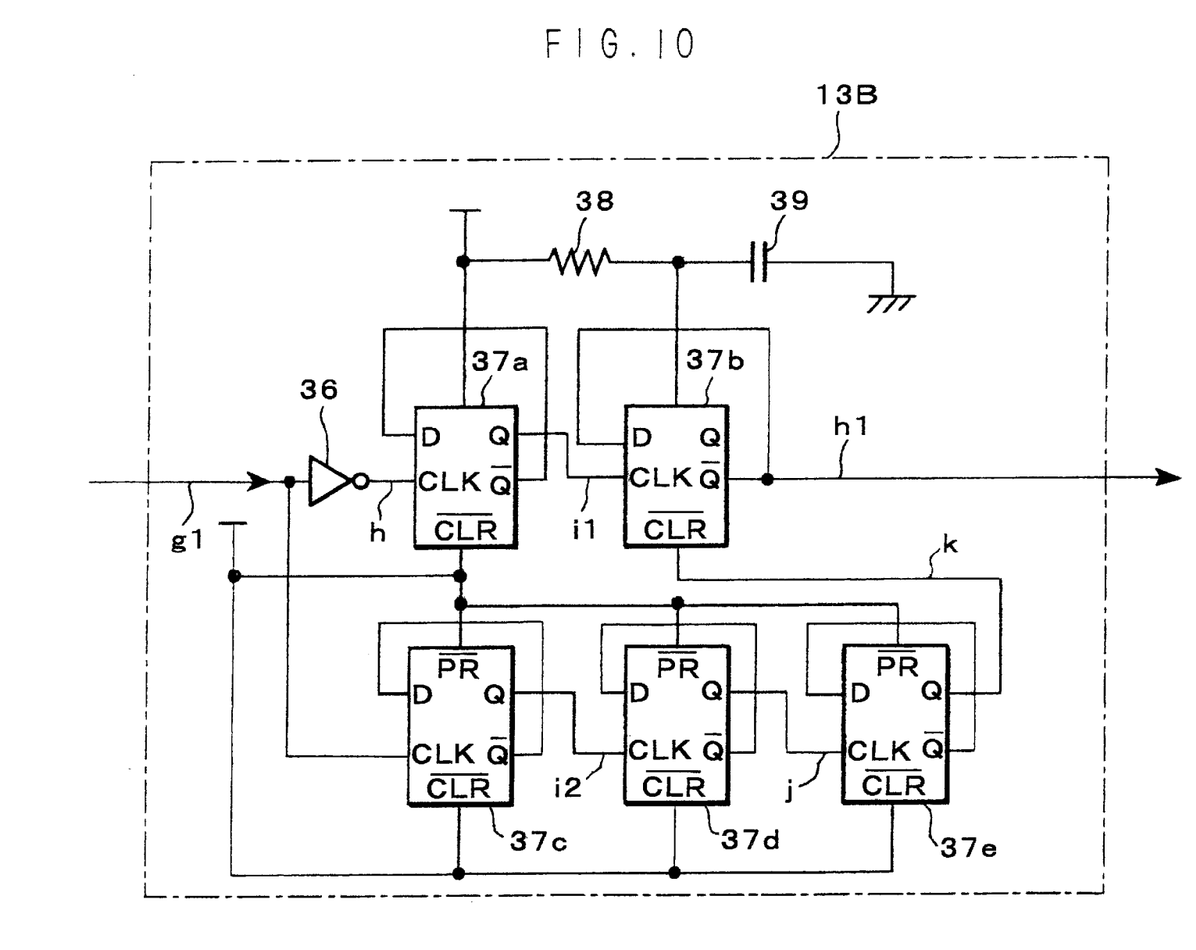
FIG. 10 is a circuit diagram of the other embodiment of an exciting current signal generating circuit of the heater control apparatus shown in FIG. 6.

FIG. 10 shows an exciting current signal generating circuit 13B which is the other embodiment of the exciting current signal generating circuit 13 shown in FIG. 6.

As shown in FIG. 10, the exciting current signal generating circuit 13B is composed of the inverter gate 36, five D-flip-flops 37a, 37b, 37c, 37d, 37e, the resistor 38 and the capacitor 39.

Figure 11:
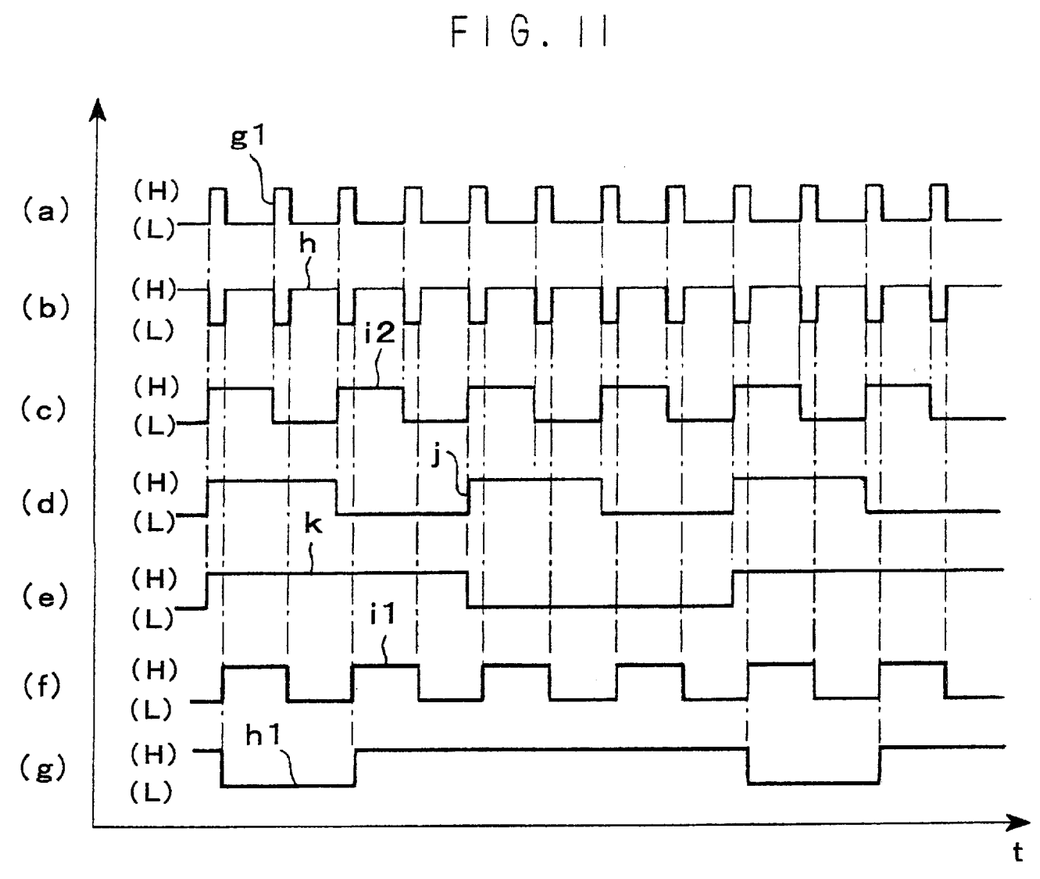
FIG. 11 is a timing chart of an operation of the exciting current signal generating circuit shown in FIG. 10.

The D-flip-flop 37c receives the input voltage discrimination signal g1 from the photo coupler 17b and generates the frequency divided signal i2 which is a signal frequency divided the input voltage discrimination signal g1 by 2 at such a timing that the input voltage discrimination signal g1 is changed to the high level "H" from the low level "L" as shown in FIG. 11(c).

The D-flip-flop 37d receives the frequency divided signal i2 and generates a frequency divided signal j which is a signal frequency divided the input voltage discrimination signal g1 by 4 at such a timing that the input frequency divided signal i2 is changed to the high level "H" from the low level "L" as shown in FIG. 11(d).

The D-flip-flop 37e receives the frequency divided signal j and generates a frequency divided signal k which is a signal frequency divided the input voltage discrimination signal g1 by 8 at such a timing that the input frequency divided signal j is changed to the high level "H" from the low level "L" as shown in FIG. 11(e).

The inverter gate 36 receives the input voltage discrimination signal g1 and generates a signal h which is an inverted signal of the input voltage discrimination signal g1, as shown in FIG. 11(b).

The D-flip-flops 37a receives the inverted signal h and generates a frequency divided signal i1 which is a signal frequency divided the inverted signal h by 2 at such a timing that the inverted signal h is changed to the high level "H" from the low level "L" as shown in FIG. 11(f).

The D-flip-flop 37b receives the frequency divided signals i1 and k and generates a frequency divided signal h1 which is a signal frequency divided the inverted signal h by 4 at such a timing that the frequency divided signal i1 is changed to the high level "H" from the low level "L" as shown in FIG. 11(g), only when the frequency divided signal k is the high level "H". The exciting current signal h1 becomes a low level "L" every eight pulses of the inverted signal h so as to maintain a high level "H" when the frequency divided signal k is the low level "L".

Figure 12:
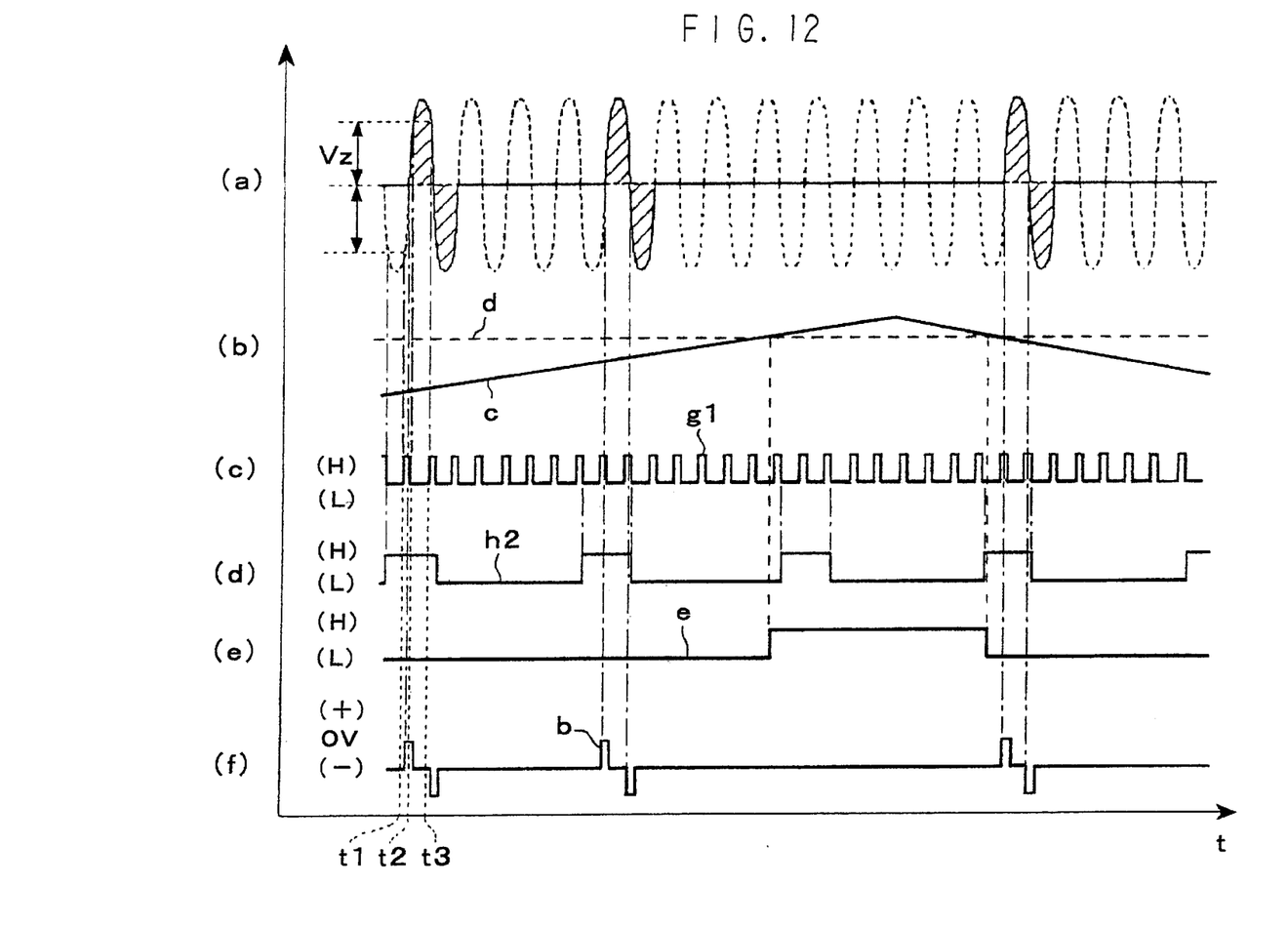
FIG. 12 is a timing chart of an operation of the heater control apparatus using the exciting current signal generating circuit shown in FIG. 6.

Accordingly, the heater control apparatus using the second exciting current signal generating circuit 13B exhibits a second control property shown in FIG. 12.

In FIG. 12(a), hatched wave form portions show the heater current. The wave form of the heater current differs from that of the first control property shown in FIG. 7, and the exciting current is reduced by ¼. Specifically, the exciting current of hatched portions shown in FIG. 12(a) are applied to the heater during only one cycle among four cycles of the input voltage applied by the AC power supply 2A indicated by the solid and dotted lines in FIG. 12(a), when the control signal e shown in FIG. 12(e) is low level "L", that is, the detected temperature processing signal c is lower than the temperature setting signal d.

Further, in this embodiment, the exciting current is applied to the heater during the full-wave of the input voltage, whereas, in the former embodiment, the exciting current is applied to the heater during the half-wave of the input voltage, so that the higher harmonic current in the exciting current can be reduced.

As stated above, the input voltage discrimination signal g1 is maintained at the high level "H" when the maximum value (absolute value) of the input voltage is lower than the input voltage discrimination standard value.

The exciting current signal generating circuit 13 generates the exciting current h1 of low level "L" when the input voltage discrimination signal g1 is maintained at the high level "H" during a term more than one cycle of the AC power supply 2A, so that the transistor 14 is turned OFF and the heater is excited by the current of full-wave.

Accordingly, the input voltage discrimination standard value is set to a value larger than the maximum value of the input voltage applied by the low voltage power supply, but lower than the maximum value of the input voltage applied by the high voltage power supply.

As stated above, the voltage applied to the heater by the high voltage power supply can substantially be equal to that by the low voltage power supply by varying the applying manner to the heater.

Specifically, an effective value Erms1 of the AC voltage is expressed by a following formula (1) if the maximum value is Em1.

$$\text{Erms1} = \text{Em1}/\sqrt{2} \tag{1}$$

Further, an effective value Erms2 of ¼ wave (solid line portions) of the AC voltage shown in FIG. 7 is expressed by a following formula (2) if the maximum value is Em2.

$$\text{Erms2} = \sqrt{\frac{1}{4\pi} \int_0^\pi Em2^2 \sin^2\theta d\theta} = \sqrt{\frac{Em2^2}{4\pi} \int_0^\pi \frac{1}{2}(1-\cos2\theta)d\theta}$$

$$= \sqrt{\frac{Em2^2}{4\pi \cdot 2}\left[\theta - \frac{1}{2}\sin2\theta\right]_0^\pi} = \sqrt{\frac{Em2^2}{4\pi \cdot 2} \cdot \pi} = \frac{Em2}{\sqrt{8}} \tag{2}$$

The effective value Erms2 in case of ¼ wave of the AC voltage is expressed by a following formula (3).

$$\text{Erms2} = \sqrt{2} \cdot \text{Erms1}/\sqrt{8} = \text{Erms}\sqrt{1/2} \tag{3}$$

Accordingly, the effective value of full-wave of the AC voltage becomes equal to the effective value in case that the ¼ wave of the AC voltage of two times.

It can be applied similarly to the heater control apparatus using the exciting current signal generating circuit 13B shown in FIG. 10.

Accordingly, in the heater control apparatus of the present invention, it is not necessary to adjust the temperature setting according to the level of the AC voltage on the contrary to the conventional apparatus, because the level of the input voltage is discriminated by the exciting current control circuit and in case of low level of the input voltage, the full-wave of the input voltage is applied to the heater and in case of high level of the input voltage, the ¼ wave of the input voltage is applied to the heater, so that the effective values of the input voltage applied to the heater in both cases are substantially equal to each other.

As stated above, the heater control apparatus according to the present invention has following merits.

(1) It is possible to generate automatically the exciting current signal according to at least two levels of the input voltage by the exciting current control circuit.

(2) The temperature control properties for different levels of the input voltage can be made equal without adjusting.

(3) It is possible to generate automatically the exciting current signal which can be changed between the full-wave exciting and the ¼ wave exciting according to the levels of the input voltage which are different about twice from each other by the exciting current control circuit.

(4) The temperature control properties for different levels of the input voltage which are different about twice from each other can be made equal without adjusting.

What is claimed is:

1. A heater control apparatus comprising a power element for exciting a heater, a temperature detection element for detecting a temperature of the heater or an object heated by the heater, an exciting current control circuit having a zero crossing detecting circuit for detecting the zero crossing point of an input voltage, and an input voltage discrimination circuit for discriminating levels of the input voltage, and a temperature control circuit for generating an exciting current control signal for the power element, wherein in case that the input voltage applied by an AC power supply is the lowest level, the heater is excited by a current corresponding to a full-wave of the input voltage, and in case that the input voltage applied by an AC power supply is a level other than the lowest level, the heater is excited by a current substantially equal to that in the case of the input voltage of the lowest level, the current in case of the level other than the lowest level being obtained by setting a range of an applying time of the input voltage to the heater according to the input voltage level of the AC power source and the frequency thereof.

2. A heater control apparatus comprising a power element for exciting a heater, a temperature detection element for detecting a temperature of the heater or an object heated by the heater, and a temperature control circuit for generating an exciting current control signal for the power element, wherein in case that the input voltage applied by an AC power supply is the lowest level, the heater is excited by a current corresponding to a full-wave of the input voltage, and in case that the input voltage applied by an AC power supply is a level other than the lowest level, the heater is excited by a current substantially equal to that in the case of the input voltage of the lowest level, the current in case of the level other than the lowest level being obtained by setting a range of an applying time of the input voltage to the heater according to the input voltage level of the AC power source and the frequency thereof, an exciting current control circuit having a zero crossing detecting circuit for detecting the zero crossing point of the input voltage, and an input voltage discrimination circuit for discriminating levels of the input voltage, a frequency setting switch which is set according to a zero crossing detecting signal, an input voltage discrimination signal and the frequency of the AC power supply, an exciting current signal generating circuit for detecting the state of the frequency setting switch and generating a first exciting current signal, and a transistor for receiving the first exciting current signal and generating a second exciting current signal.

3. The heater control apparatus as claimed in claim 2, wherein the zero crossing detecting circuit comprises a photo coupler connected to the AC power supply through a resistor for generating the zero crossing detecting signal consisting of a low level signal and a high level signal repeated alternately corresponding to (+) cycle and (−) cycle of the input voltage of the AC power supply.

4. The heater control apparatus as claimed in claim 2, wherein the input voltage discrimination circuit comprises a rectifying circuit for rectifying an input AC voltage to an DC voltage, and a predetermined number of circuits connected in parallel to the AC power supply, each circuit comprising a resistor, a photo coupler and a Zener diode connected in series, and wherein the level of the voltage of the AC power supply is discriminated by the conduction of the photo couplers on the basis of the voltage level set to the Zener diode.

5. The heater control apparatus as claimed in claim 2, wherein the exciting current signal generating circuit comprises an exclusive OR gate for generating a trigger pulse signal at the zero crossing point of the input voltage, a group of resistors and a capacitor for setting a period of time from the zero crossing point to the generation of the first exciting current signal, a group of analog switches for switching the group of resistors according to the level of the voltage of the power source, and a combination of a NAND gate, an inverter gate and a frequency setting switch for processing the input voltage discrimination signal in order to select the ON and OFF of the analog switches, a monostable multivibrator, an exclusive OR gate, an inverter gate and an AND gate for generating the first exciting current signal after the period of time, wherein when the frequency setting switch is set according to the frequency of the power supply, the first exciting current signal corresponding to the level of the voltage of the power source is generated automatically.

6. A heater control apparatus comprising a power element for exciting a heater, a temperature detection element for detecting a temperature of the heater or an object heated by the heater, and a temperature control circuit for generating an exciting current control signal for the power element, wherein in case that a voltage of an AC power supply is the lowest level, the heater is excited by a current corresponding to a full-wave of the input voltage, and in case that the input voltage is a high level, the heater is excited by a current corresponding to a ¼ wave of the input voltage.

7. The heater control apparatus as claimed in claim 6, further comprising an exciting current control circuit having a full-wave rectifier for rectifying a full-wave of the input voltage, a current limiting resistor for limiting a current flow from the AC power supply, a Zener diode for setting an input voltage discrimination standard value for discriminating a level of the input voltage, a photo coupler for generating an input voltage discrimination signal, an exciting current signal generating circuit for receiving the input voltage discrimination signal and generating a first exciting current signal, and a transistor for receiving the first exciting current signal and generating a second exciting current signal.

8. The heater control apparatus as claimed in claim 7, wherein the exciting current signal generating circuit comprises an inverter gate and three D-flip-flops, wherein a control signal is generated for applying a half cycle among the two cycles of the input voltage to the heater and a voltage of ¼ of the full-wave of the input voltage is applied to the heater.

9. The heater control apparatus as claimed in claim 7, wherein the exciting current signal generating circuit comprises an inverter gate and five D-flip-flops, wherein a control signal is generated for applying one cycle among the four cycles of the input voltage to the heater and a voltage of ¼ of the full-wave of the input voltage is applied to the heater.

* * * * *